INVENTOR
CALEB FREDERICK WOLFENDALE
BY Hame and Nydick
ATTORNEYS

United States Patent Office 3,383,668
Patented May 14, 1968

3,383,668
CAPACITIVE POTENTIOMETER REBALANCING SYSTEM
Caleb Frederick Wolfendale, Great Brick Hill, near Bletchley, England, assignor to Sogenique (Electronics) Limited
Original application Sept. 26, 1961, Ser. No. 140,874, now Patent No. 3,287,716, dated Nov. 22, 1966. Divided and this application Mar. 3, 1966, Ser. No. 531,574
Claims priority, application Great Britain, Sept. 27, 1960, 33,144/60
4 Claims. (Cl. 340—187)

ABSTRACT OF THE DISCLOSURE

The application discloses an automatically balancing bridge including a capacitive potentiometer comprising a line of discrete stator electrodes coupled electrostatically to a movable pick-off electrode, a manually settable reference potential divider, a servo responsive to the potential difference between the reference divider tap and the pick-off electrode, and a selectable switch system for altering and controlling the scale of the movement.

---

This invention relates to electric position-determining and position-control apparatus. More specifically, the invention relates to such apparatus employing a position-sensitive means comprising two relatively movable members, one of which is part of a capacitative potentiometer, and the other a cooperating electrode. This case is a division of my copending application S.N. 140,874, filed Sept. 26, 1961, now U.S. Patent 3,287,716. An apparatus of this kind is described in my copending application Serial No. 844,605 filed Sept. 29, 1959, now Patent No. 3,071,758.

One form of apparatus described in that application comprises a capacitative potentiometer consisting of a line of discrete conductive elements, and a pick-up electrode; the pick-up electrode is insulated from the elements, but is capacitatively coupled thereto. Means are provided whereby relative movement can occur between the pick-up electrode and the line of elements, and as this relative movement occurs, the pick-up electrode assumes a potential the value of which is related to the potentials on the adjacent elements. The present invention concerns improvements in apparatus of this general kind.

The invention consists broadly of a position responsive apparatus comprising a potentiometric device including a series of elements adapted to be energised from a potential source to establish a spatial field distribution, a pick-off means mounted for movement relative to said elements for deriving from said field a potential which is a function of the relative position of said means and said elements, reference means adapted to be energised from said source for establishing a point of reference potential, position indicating or control means responding to a signal derived from the difference in potential between said point of reference potential and said pick-off means, and means for modifying the effective variation of said signal for a given relative movement of said elements and said pick-off means.

Other features and advantages of the invention will appear from the following description of embodiments thereof, given by way of example, in conjunction with the accompanying drawings.

Figure 1:
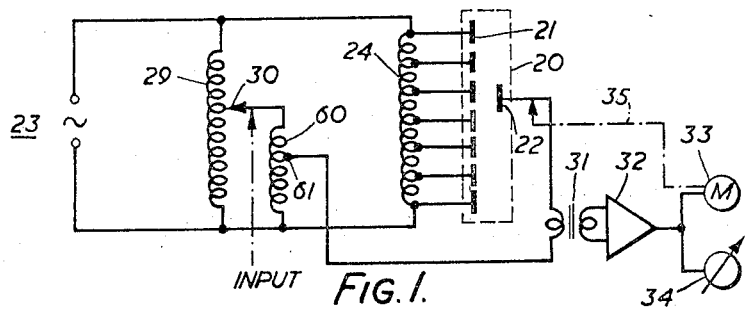
FIG. 1 is a simplified circuit diagram of a position-responsive apparatus according to the invention.

One form of the invention is shown in FIGURE 1, and is an apparatus which can be used to move an element to a predetermined position. In FIGURE 1, a capacitative potentiometer, the parts of which are enclosed within the dotted rectangle 20, comprises a series of conductive elements 21 and a relatively movable element 22; in the present case the elements 21 are stationary, the electrode 22 being movable. Electrical potentials which are applied to the elements are derived from an alternating current source 23, across which is connected a first inductive device 24. The device 24 has on it a number of taps connected respectively to the elements 21. By appropriate selection of the taps and the nature of the potential gradient along the length of the series of elements 21 can be selected or adjusted to follow a wide range of characteristics. Thus, the gradient can be made to follow a linear, or non-linear, law.

In the manner described above, as the movable electrode 22 moves along the elements 21 it will assume a potential, with respect to a reference point, which is a smooth and progressive function of its position relative to the elements of the potentiometer.

The reference point can be so chosen that when the electrode 22 attains a particular position with respect to elements 21 the potential of the electrode 22 has a predetermined value with respect to that of the reference point; hence, the positioning of the movable electrode can be directly observed, or controlled, by the difference between the potential of the electrode and that predetermined value, and the electrode can be brought to the chosen position by moving it until this potential difference is zero.

One means of establishing the reference point is shown in FIGURE 1: a second inductive device 29 is fed from supply 23, and device 29 has a variable tapping point 30 upon it. The potential difference between tap 30 and electrode 22 is applied through transformer 31 to amplifier 32. Amplifier 32 can control a reversible servo motor 34 which will drive electrode 22, as indicated by line 35, in a correcting, null-seeking sense until electrode 22 is in the predetermined position.

In operation, tap 30 is set to a position which corresponds to the desired position of the movable electrode 22. If the electrode is not in the desired position, there will occur between tap 30 and electrode 22 a potential which is a function of that difference; this potential difference can be referred to as an error signal. This error signal will by its magnitude and its phase be characteristic both of the extent and direction of the distance of the movable electrode from the desired position.

Where the apparatus is to be used for indicating the position of a movable element with respect to the setting of the tap 30, an indicator 34 can be used, or motor 33 could be made to vary the position of the tap 30 on the potentiometer 29, instead of the pick-off electrode, until the error signal falls to zero; the position of tap 30 can be shown on any suitable indicating device.

It is important that the apparatus should have provision for alteration of scale; that is to say alteration of the slope of the movement characteristics. To this end an additional auto-transformer 60 is connected across an adjustable portion of the inductive device 29. An adjustable tap 61 on the auto-transformer then establishes the voltage which is compared with the pick-off voltage.

Figure 2:
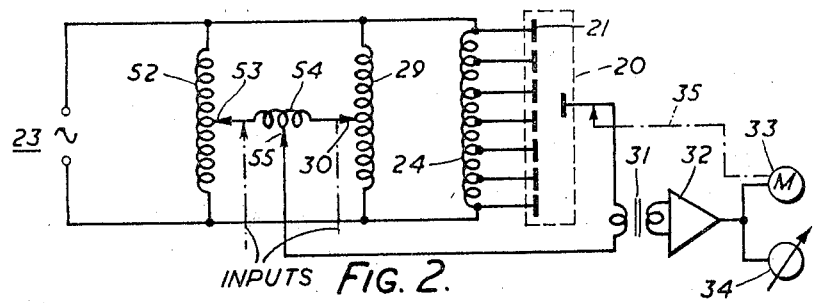
FIG. 2 is a simplified circuit diagram of another position-responsive apparatus.

In the arrangement of FIGURE 2 is shown another means for adjusting the reference potential. In FIGURE 2, the inductive element 29 is supplemented by a similar element 52, with a variable tap 53. A transformer, indicated as an auto-transformer consisting of an inductor 54 tapped at 55, is connected between taps 53 and 39; the tap 55 establishes the reference potential.

The voltage at the reference point will depend upon the settings of both the variable taps 53 and 30. The movable tap 53 provides an adjustable off-set for the reference voltage. The relative effects of the two adjustments will depend upon the ratio of auto-transformer 54 and hence movement of tap 55 adjusts the scale of movement.

Figure 3:
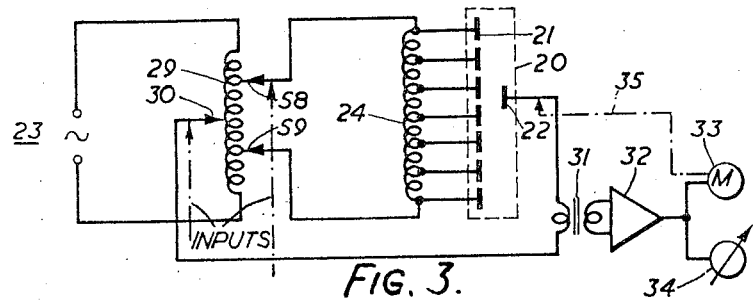
FIG. 3 is a simplified circuit diagram of still another position-responsive apparatus.

FIGURE 3 shows another arrangement in which the reference potentials are adjustable in such a way as to provide an effect which is equivalent to alteration of scale, and also to give zero-setting. In this case, the voltages applied to the elements of the capacitative potentiometer 20 are derived from tappings on the inductive device 24 but the ends of device 29 are connected to two adjustable taps 58, 59 on the inductive element 29. Hence it will be seen that by adjusting the relative position of these taps, the magnitude of the voltage across the device 24 can be varied, and in consequence the magnitudes of the respective voltages on the elements of the potentiometer to give adjustment of the scale. Moreover, step-up effect could be obtained, by reversing the arrangement and connecting the element 29 to two taps on the device 24.

Figure 4:
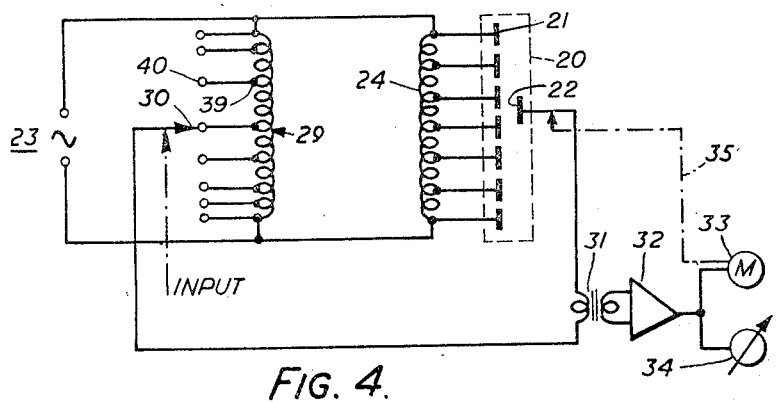
FIG. 4 is a simplified circuit diagram of a still further position-responsive apparatus adding thereto another feature.

As illustrated in FIGURE 4 the law of response of the apparatus need not be linear. As shown, taps 39 connected to studs 40 may be spaced at predetermined, unequal intervals, which will give a response law consisting of a series of straight line approximations to a curve. It will be understood that the described methods of scaling can be combined, for example by means of switches, to afford different scale ranges, sensitivities, offsets, or the like, as desired. In all cases a plurality of external setting controls can be provided.

It will be appreciated that guard electrodes and the like will be provided, as necessary, in practice.

It will be appreciated also that the number of elements of the capacitative potentiometer, taps on devices 24, 29 or 39 and contacts on switches 55 and 56 can be different, either greater or less, from the numbers shown. Also, it may be convenient in some cases to combine elements such as 24 and 30 in a common inductive device. Again, two or more elements such as 20 can be combined, with the same or different effective scales, to operate from a common element such as 30.

I claim:

1. A position responsive apparatus comprising a potentiometric device including a line of conductive electrode plates, inductive means for connection to a source of alternating potential and having a series of intermediate connecting points, electrical connections connecting said electrode plates to respective ones of said connecting points for establishing a progressively varying alternating potential field along the line of electrode plates, and pick-off means movable along said line of electrode plates and capacitively coupled thereto for deriving from said potential field a potential that is a smooth progressive function of the position of said pick-off means relative said electrode plates whereby to interpolate between the potentials of said electrode plates, reference means including means producing at a series of points respective potentials which vary progressively along the series, connection means for selective connection to said points to establish a point of reference potential, and indicator means for indicating the position of said selective means, output signal means responsive to the relative values of said reference potential and the potential of said pick-off means for producing an output signal varying as a smooth function of the relative position of said pick-off means, and switch means for selectively modifying the progression of potential along said series of points of said reference means relative to the progression of potential along said line of electrode plates whereby to control the slope of the movement characteristics of the apparatus.

2. A position responsive apparatus according to claim 1 further including servo means responsive to said output signal for moving said pick-off means to a position relative said electrode plates in which the potential on said pick-off means bears a predetermined relation to said reference potential, said switch means controlling the displacement of said pick-off means corresponding to a given change in said reference potential.

3. A position responsive apparatus according to claim 1 wherein said switch means comprises inductive means having a selectable tapping point thereon, which last said inductive means is connected to said connection means of said reference means for producing at said tapping point a potential proportional to said reference potential, said output signal means being connected to said tapping point.

4. A position responsive apparatus according to claim 1 wherein said reference means includes inductive potential divider means for establishing said point of reference potential, and said switch means comprises means for selectably modifying the proportion of the potential from said source applied to said inductive means of said potentiometric device.

References Cited

UNITED STATES PATENTS 3,287,716  11/1966  Wolfendale _____ 340—200

THOMAS B. HABECKER, *Primary Examiner.*